United States Patent
Halim et al.

(10) Patent No.: US 9,367,293 B2
(45) Date of Patent: Jun. 14, 2016

(54) SYSTEM AND METHOD FOR COMPILER ASSISTED PARALLELIZATION OF A STREAM PROCESSING OPERATOR

(75) Inventors: Nagui Halim, Yorktown Heights, NY (US); Vibhore Kumar, Hawthorne, NY (US); Kung-Lung Wu, Yorktown Heights, NY (US); Sai Wu, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/525,917

(22) Filed: Jun. 18, 2012

(65) Prior Publication Data

US 2014/0196017 A1  Jul. 10, 2014

(51) Int. Cl.
G06F 9/44 (2006.01)
G06F 9/45 (2006.01)

(52) U.S. Cl.
CPC ........................ *G06F 8/45* (2013.01)

(58) Field of Classification Search
CPC ........ G06F 9/5066; G06F 9/3851; G06F 8/45
USPC .................................................. 717/106, 220
See application file for complete search history.

(56) References Cited

U.S. PATENT DOCUMENTS

| | | | |
|---|---|---|---|
| 6,311,265 B1 | 10/2001 | Beckerle et al. | |
| 7,490,218 B2 | 2/2009 | Eggers et al. | |
| 7,571,301 B2 | 8/2009 | Kejariwal et al. | |
| 2008/0077570 A1 | 3/2008 | Tang et al. | |
| 2008/0133891 A1* | 6/2008 | Salz | G06F 8/30 712/220 |
| 2008/0134158 A1 | 6/2008 | Salz et al. | |
| 2011/0047159 A1 | 2/2011 | Baid et al. | |
| 2011/0225167 A1 | 9/2011 | Bhattacharjee et al. | |
| 2011/0246535 A1 | 10/2011 | Freeman et al. | |
| 2012/0089961 A1* | 4/2012 | Ringseth | G06F 8/314 717/106 |
| 2013/0117317 A1* | 5/2013 | Wolf | G06F 17/30516 707/792 |

FOREIGN PATENT DOCUMENTS

WO  WO 2011/110809 A1  9/2011
WO  WO 2011/126995 A1  10/2011

OTHER PUBLICATIONS

Schneider et al. (Elastic Scaling of Data Parallel Operators in Stream Processing, 2009).*
N. Backman. "A fine-grained, dynamic load distribution model for parallel stream processing". Master's Theses, Brown University, 2009.

(Continued)

*Primary Examiner* — Li B Zhen
*Assistant Examiner* — Lenin Paulino
(74) *Attorney, Agent, or Firm* — Francis Lammes; Stephen J. Walder, Jr.; Jeff Tang

(57) ABSTRACT

A method of enabling compiler assisted parallelization of one or more stream processing operators in a stream processing application, which consists of a data flow graph with operators as vertices connected by streams. The method includes specifying a parallelized version of one or more of the operators, with a parameterized degree of parallelism, in the stream application, evaluating whether or not to use the parallelized operator, deciding the degree of parallelism of the parallelized operator, if there is a need for a parallelized operator.

15 Claims, 11 Drawing Sheets

(56) References Cited

OTHER PUBLICATIONS

S. Schneider, H. Andrade, B. Gedik, A. Biem, and K.-L.Wu. "Elastic scaling of data parallel operators in stream processing." IPDPS, 2009.

Maluf et al., "Managing Unstructured Data With Structured Legacy Systems," Aerospace Conference, 2008 IEEE.

Buneman et al., "Adding Structure to Unstructured Data," In 6th Int. Conf. on Database Theory (ICDT '97),LNCS 1186, 336-350, 1997.

Beliefnetworks, Inc., "Semantically Secure Unstructured Data Classfication," BeliefNetworks, inc. Charleston, South Carolina, Apr. 7, 2010.

Unitas, "A Single View: Integrating Structured and Unstructured data/Information within the Enterprise.", BackWeb ProactivePortal Server White Paper, Jan. 2002.

Bueno, Francisco et al., "Effectiveness of Abstract Interpretation in Automatic Parallelization: A Case Study in Logic Programming", ACM Transactions on Programming Languages and Systems, vol. 21, No. 2, Mar. 1999, pp. 189-239.

Omtzigt, E. Theodore L., "Domain Flow and Streaming Architectures", IEEE Proceedings of the International Conference on Application Specific Array Processors 1990, paper dated Jul. 9, 1990, conference date Sep. 5-7, 1990, Princeton, NJ, pp. 438-447.

Pillai, Padmanabhan S. et al., "SLIPstream: Scalable Low-latency Interactive Perception on Streaming Data", NOSSDAV'09, Williamsburg, Virginia, Jun. 3-5, 2009, pp. 43-48.

Sermulins, Janis et al., "Cache Aware Optimization of Stream Programs", LCTES'05, Chicago, Illinois, Jun. 15-17, 2005, pp. 115-126.

\* cited by examiner

Code for a parallelized operator

```
<% my $eta = $context.getParallelismDegree() %>
composite ParallelKNN(input I; output O)
{
  type
    I = int32 oid, int32 x, int32 y;
    O = int32 oid, list<int32> knn;

graph
    <% my $streamsToBeMerged = "";%> splitting the input into eta streams
    <% for(my $i = 0; $i < $eta; $i++){%>
    stream<I> splitStream<%=$i%>
    <%}%>
      = Split(I){param splits: <%=$eta%>} generating eta process operators
    <%
       for(my $i = 0; $i < $eta; $i++){
          streamsToBeMerged
             = streamsToBeMerged."outputStream".$i;
          if($i != $eta - 1)
             streamsToBeMerged = streamsToBeMerged.", ";
    %>
    stream<O> outputStream<%=$i>
       = Process(splitStream<%=$i>){param k: 100}
    <%}%> merging the eta output streams
    O = Merge(<%=$streamsToBeMerged){}
}
```

FIG. 3

SYSTEM AND METHOD FOR COMPILER ASSISTED PARALLELIZATION OF A STREAM PROCESSING OPERATOR

SUBJECT INVENTION UNDER GOVERNMENT CONTRACT

This invention was made with Government support under H98230-07-C-0383 awarded by Department of Defense. The Government has certain rights to this invention.

BACKGROUND OF THE INVENTION

Over the past few years, a fair number of distributed stream processing systems have matured into a product or an open-source offering. This has led to a rapid adoption of the technology into real application domains such as financial markets, health-care and telecommunications. However, it has also resulted in real world stream processing applications that are far more complex and compute intensive, but strive for more efficient performance. In many such applications, performance is hard to achieve because of a small number of characteristically complex operators that bottleneck the performance of the entire application. In scenarios where such operators are stateless, a solution is to execute multiple copies of such an operator in parallel. However, when such bottleneck operators are stateful, enabling parallelization to avoid the bottleneck is difficult. An example of this is shown in FIG. 1, which will be discussed in further detail later.

Although a handful of stateful operators (e.g. SUM, AVG over a window of tuples) can be parallelized without the use of shared state, enabling parallelization requires the existence of a state sharing mechanism. Having a shared state makes it difficult to implement a parallel version of a stateful operator and difficult to incur additional overheads in the form of accesses to shared state and synchronization constructs. The complex enabling mechanisms coupled with the additional overheads make it novel to parallelize and to create a suitable parallelization for stateful operators.

SUMMARY OF THE INVENTION

In one aspect of the invention, a method of enabling compiler assisted parallelization of one or more stream processing operators in a stream processing application operating on a computer processing device is provided. The method includes specifying a parallelized version of one or more operators in the stream application, where the parallelized operator has a parameterized degree of parallelism and computing the degree of parallelism for the parallelized operator.

In a second aspect of the invention, a computer readable storage medium tangibly embodying a computer readable program code having computer readable instructions which, when implemented, cause a computer to carry out a method of enabling compiler assisted parallelization of one or more stream processing operators in a stream processing application operating on a computer processing device is provided. The method includes specifying a parallelized version of one or more operators in the stream application, where the parallelized operator has a parameterized degree of parallelism and computing the degree of parallelism for the parallelized operator.

BRIEF DESCRIPTION OF THE DRAWINGS

FIG. 3 illustrates a code for a parallelized operator.

DETAILED DESCRIPTION OF THE PREFERRED EMBODIMENTS

Figure 1:
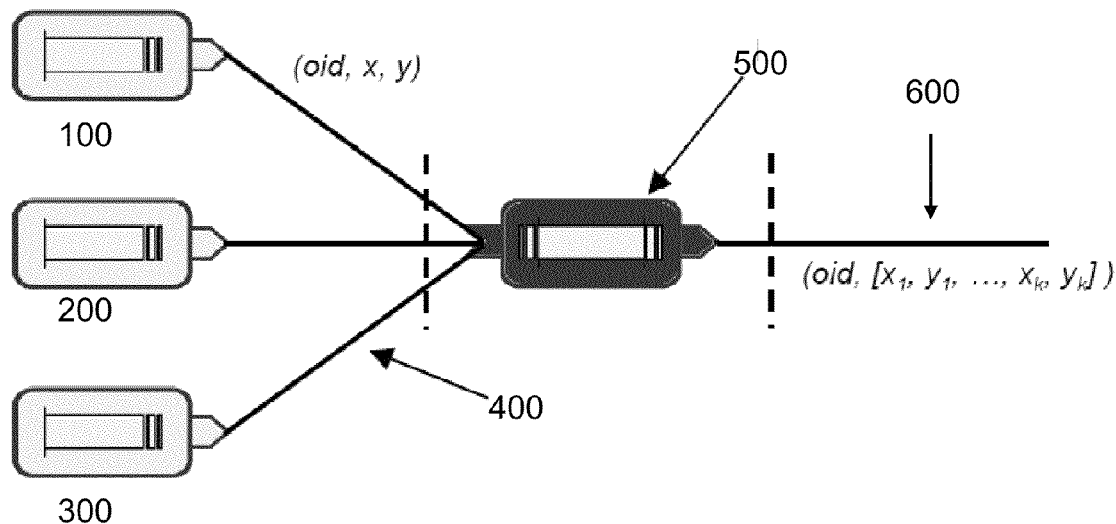
FIG. 1 illustrates a common stateful bottleneck operation.

The present invention presents a framework for parallelizing stateful operators. A general split-(process*)-merge assembly together with a state sharing mechanism as a generic model for parallelizing stateful stream processing operators is proposed. The proposed parallelization model is then augmented with a theoretical model that is based on factors like average processing time per tuple, average number of accesses to shared state per tuple and time to read/write to the shared state. The theoretical model is used to determine if parallelization can help improve the performance of the operator. In case an operator is found to be parallelizable, the theoretical model can also be used to further determine the appropriate degree of parallelism for a given set of operating conditions.

Researchers have worked on improving the performance of stream processing applications by exploiting distribution and parallelism. In particular, distributed stream processing middleware attempt to exploit the pipeline parallelism that is inherent to stream processing applications. Such middleware use runtime schedulers to determine the placement of an application's operator across a cluster of compute nodes to optimize the application performance.

However, pipeline parallelism fails to address performance issues that may occur due to monolithic compute intensive operators that may bottleneck the performance of the entire application. Work has also been done to address the performance issues that may be attributed to bottleneck operators. A scatter-process-gather model was proposed in N. Backman. "A fine-grained, dynamic load distribution model for parallel stream processing". Master's Theses, Brown University, 2009, but it focuses on parallelizing data parallel operators, which do not need shared state. More recently, researchers have also proposed parallel implementations of stream processing operators to exploit the advancement in cell processor technology S. Schneider, H. Andrade, B. Gedik, A. Biem, and K.-L. Wu. "Elastic scaling of data parallel operators in stream processing." IPDPS, 2009.

The present invention models, studies, and implements parallel operators that need a mechanism for sharing state. Specifically, the invention discloses a generic parallelization model consisting of a split-(process*)-merge assembly and a state sharing mechanism, which is proposed as the underlying design for parallelizing stateful parallel operators. The present invention also discloses a suitability of parallelization. In case of stateful operators, it is not obvious if parallelization will result in improving the application performance. Disclosed is a theoretical model to assist in determining the suitability of parallelization. Finally, the present invention discloses a degree of parallelization. Once it has been determined that an operator is suited for parallelization, the theoretical model is able to determine the optimal degree of parallelism through the operating parameters.

The parallelization framework is implemented in the context of stream processing middleware. While micro benchmarks, conducted using the above implementation, are used to validate the accuracy of the theoretical model in determining the suitability and the degree of parallelism, an implementation of moving KNN application is used to demonstrate the significant speedups that can be achieved by parallelizing the bottleneck operator in a real application.

Parallelization Framework

The generic parallelization model consists of a split-(process*)-merge assembly and a state sharing mechanism, and could be used to arrive at a parallel version of any stream processing operator. Although the parallelization model could be used to parallelize any stream processing operator, not all operators will benefit from parallelization. The theoretical model can be used to determine the suitability of parallelization and the degree of parallelism in case an operator is found to be a suitable candidate for parallelization.

Generic Parallelization Model

Figure 2:
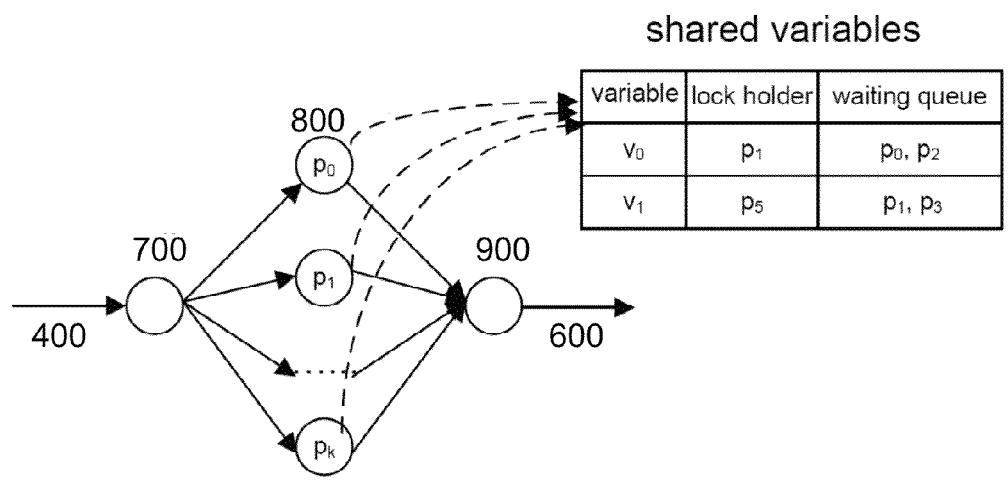
FIG. 2 illustrates the generic parallelization model.

It is clear that the performance of a single stream processing operator is limited by the hardware on which such an operator is hosted. In scenarios, where the operator is compute and/or resource intensive the performance of the operator, and that of the stream processing application containing the operator in its data-flow, starts to degrade rapidly with increasing load. To handle such bottleneck operators, a generic parallelization model, shown in FIG. 2, could be used to arrive at a parallelized version of the bottleneck operator.

The generic parallelization model consists of three operators—split (700), process (800) and merge (900) which constitute the split-(process*)-merge assembly, and utilizes shared state to enable the parallel processing of multiple copies of the process operator. The split-(process*)-merge assembly replaces the bottleneck operator in the application data-flow. In the parallelized version of the application data-flow the input to the bottleneck operator is fed to the split operator, and the output (600) of the bottleneck operator is replaced by the output stream coming from the merge operator.

The split operator consumes the output stream that was earlier consumed by the bottleneck operator. The default split operator outputs the incoming stream tuples to a specified number of output streams in a round-robin and/or hash-based manner. Round-robin and hash-based schemes are well known in the art. A custom split function could be implemented by the user to override the default behavior of this operator.

The process operator performs the task that was earlier done by the bottleneck operator. However, since multiple process operators can be executing simultaneously the processing logic may have to utilize a shared state, and the access to such shared state may have to be synchronized.

The merge operator consumes the output streams from the process operators to generate the final output stream. The merge operator by default simply forwards the output to its output port. However, a user or library developer can modify this default behavior and performing additional processing (e.g. enforce ordering amongst the output tuples) before forwarding the output.

Several bottleneck operators, in order to be parallelized, need to maintain a common shared state that may be accessed by the instances of the parallelized operator. The atomic access to individual variables that are maintained as part of the shared state is assumed, but synchronization constructs like shared locks may be needed to ensure atomic access across a group of variables resident in the shared state.

Theoretical Model

Figure 17:
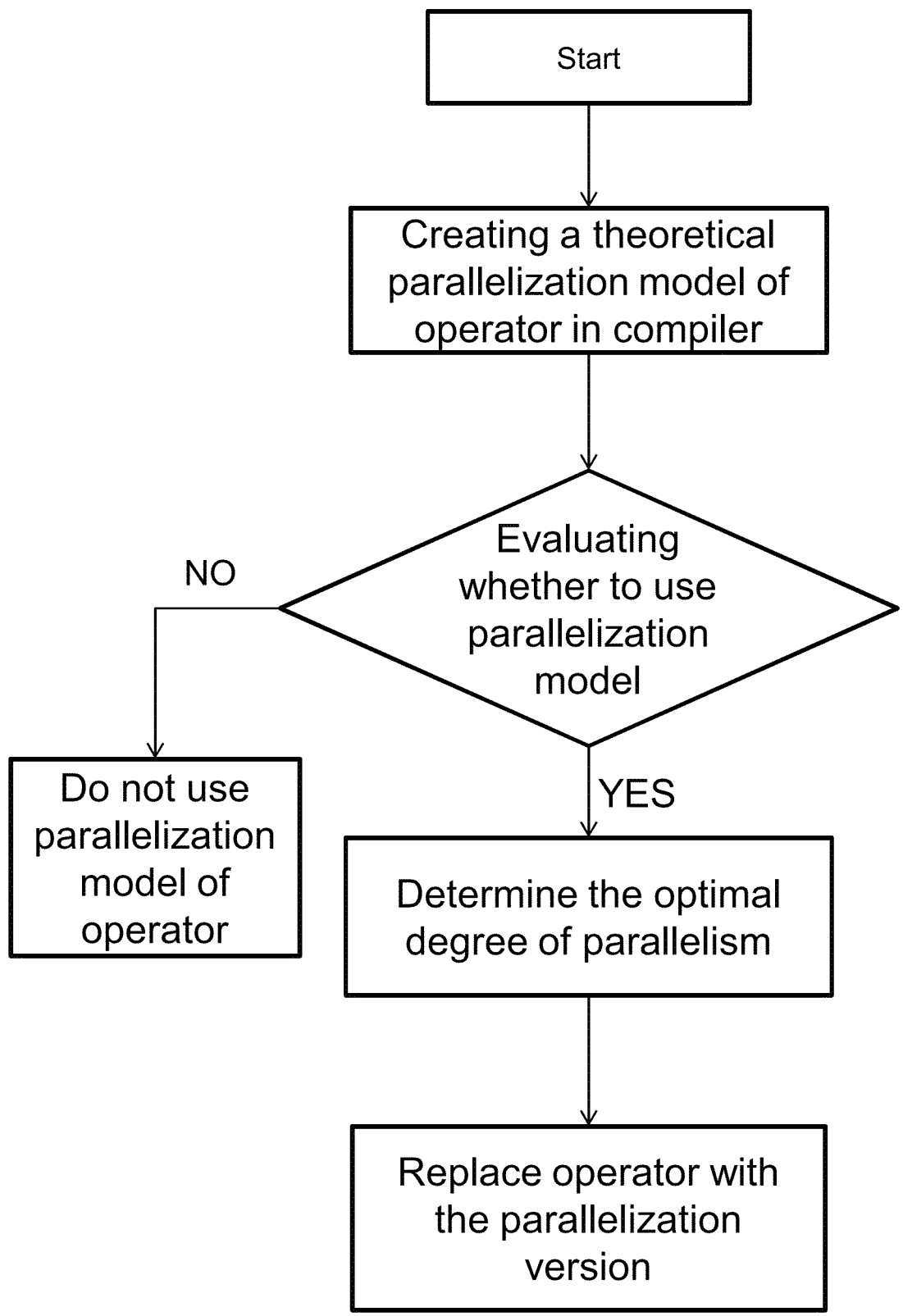
FIG. 17 illustrates a flowchart of the proposed invention.

Parallelization introduces overheads, and in some scenarios the overheads may outweigh the benefits. In the model described above, such overheads can be attributed to two factors—(a) overhead imposed by access to shared state, and (b) synchronization overheads. In the following subsections, deriving a theoretical model for estimating the cost of parallelization, and using the model to determine the suitability of parallelization and the optimal degree of parallelism for a given bottleneck operator is provided. In FIG. 17, a flowchart of creating a theoretical model is described. The first step of the method is to create a theoretical parallelization of the model of the operator in the compiler. Next, the compiler evaluates whether or not to use the theoretical parallelization model. If the compiler decides to use the parallelization model, then the compiler will decide the optimal degree of parallelization. Finally, the operator is replaced with the parallelization version. The details of the method are herein described.

Assumptions & Notation

One must assume that a single non-parallelized operator takes time T to process an incoming tuple. In case of non-parallelized operator, all accesses to memory are local and one assumes the cost of local memory access to be negligible. When an operator has to be parallelized it may require the use of shared state that is accessed by the process operator. In such scenarios, the processing logic may dictate exclusive or non-exclusive access to the shared state. Without loss of generality, one can divide the time T spent by a single non-parallelized operator in processing a tuple into three segments: a pre-critical segment of duration $t_0$ in which an operator, when parallelized, needs only a non-exclusive access to the shared state, followed by a critical segment of duration $t_1$ in which the operator should have an exclusive access and a post-critical segment of duration $t_2$ with non-exclusive access. Note that the durations $t_0$, $t_1$ and $t_2$ correspond to a non-parallelized operator and therefore $T=t_0+t_1+t_2$.

$\eta$ is used to denote the number of process operators, $\alpha_r$ and $\alpha_w$ are used to denote the number of non-exclusive reads and writes to the shared state, and finally, $\beta_r$ and $\beta_w$ are used to represent the number of exclusive reads and writes to the shared state. The configuration of a parallelized operator is represented using the following n-tuple $<\eta, \alpha_r, \alpha_w, \beta_r, \beta_w>$, and the throughput corresponding to a given parallelized operator configuration is represented as $T_{<\eta,\alpha_r,\alpha_w,\beta_r,\beta_w>}$. $\phi_r$ and $\phi_w$ is used to denote average read and write access latency to the shared state, respectively. A simplifying assumption that the access latency is independent of the number of process operators and the frequency of access is made. An assumption that the lock is implemented as a special variable, which is maintained as part of the shared state, is made. Under this assumption the lock acquisition latency is equivalent to $\phi_w$+w, where w is the wait time and the latency of releasing is equivalent to $\phi_w$.

Single Process Operator

If only one process operator exists, there is no need for shared state. However, to facilitate comparison, determining the throughput that can be achieved using a single process operator configuration without and with the shared state. In the scenario when an operator's state is maintained in local memory, the access cost can be ignored.

The net throughput depends only on the time taken to execute the processing logic. Therefore, the maximum possible throughput can be estimated as:

$$T_{\langle 1,0,0,0,0 \rangle} = \frac{1}{T} \qquad \text{(Expression 1)}$$

where T, as noted earlier, is the sum of pre-critical, critical and post-critical processing durations (i.e. $T=t_0+t_1+t_2$). If using shared state to maintain a part of an operator's internal state, additional access overheads will be introduced. Such overheads are dependent on the total number of accesses to the shared state. Furthermore, since there is only process operator there is no need for exclusive access. The maximum throughput without exclusive access can be estimated as:

$$T_{\langle 1,\alpha_r,\alpha_w,0,0 \rangle} = \frac{1}{(T + \alpha_r\phi_r + \alpha_w\phi_w)} \qquad \text{(Expression 2)}$$

and in a hypothetical scenario when exclusive access to shared state is needed, the overhead corresponding to lock acquisition and release is added to the computation. The maximum throughput, in this case, can be computed using:

$$T_{\langle 1,\alpha_r,\alpha_w,\beta_r,\beta_w \rangle} = \frac{1}{(T + (\alpha_r + \beta_r)\phi_r + (\alpha_w + \beta_w + 2)\phi_w)} \qquad \text{(Expression 3)}$$

where $\phi_r$ and $\phi_w$ represent the average costs of reading and writing to shared state in a single operator case. The difference of Expression 2 and 3 is the additional cost of acquiring and releasing lock ($2\phi_w$), and in this case w=0.

Multiple Process Operators

A model of the impact of multiple process operators on the throughput delivered by a parallelized operator is provided. First, a model of the case in which the process operators do not access the shared state is expressed. This is the case when stateless operators like filter are parallelized, and the maximum throughput in this scenario can be estimated using the following formulation:

$$T_{\langle \eta,0,0,0,0 \rangle} = \frac{\eta}{T} \qquad \text{(Expression 4)}$$

In scenarios where the process operators need to access shared state, they may do so by requiring non-exclusive or exclusive access. When the process operators require only non-exclusive access, locks are not needed and the throughput in this scenario can be estimated using:

$$T_{\langle \eta,\alpha_r,\alpha_w,0,0 \rangle} = \frac{\eta}{T + \alpha_r\phi_r + \alpha_w\phi_w} \qquad \text{(Expression 5)}$$

When exclusive access is required, shared locks are needed and the maximum throughput also becomes critically on the duration for which the lock is held by each process operator for processing an incoming tuple. The average time C taken to process a tuple for a specific parallelization scenario depicted by the n-tuple $\langle \eta, \alpha_r, \alpha_w, \beta_r, \beta_w \rangle$ can then be estimated using:

$$C=T+\alpha_r\phi_r+\alpha_w\phi_w+2\phi_w+\beta_r\phi_r+\beta_w\phi_w+w \qquad \text{(Expression 6)}$$

where w is the wait time before the lock is acquired.

In order to determine the throughput when exclusive access is required for operator parallelization, a focus is on calculating the wait time w. Let $R_{in}$ be the rate (in tuples per second) at which the tuples arrive at the spilt operator. On average a process operator receives an input tuple every $$\frac{\eta}{R_{in}}$$

seconds. A quantity—slack time or $t_s$ is defined which is computed as $$\max\left(0, -\frac{\eta}{R'_{in}}C\right)$$

if $t_s>0$ then the operator completes the processing before the next tuples arrives, and the throughput for the process operator in this case is $$\frac{R_{in}}{\eta}$$

otherwise, the throughput rate is $$\frac{1}{C}.$$

This leads to the following lemma:

Lemma 1. If $t_s>0$, the output stream rate $R_{out}$ equals the input stream rate $R_{in}$.

Proof. If $t_s>0$, the process operator will wait for the incoming tuple. Therefore, the net throughput in this case becomes equal to the incoming stream rate $R_{in}$.

Let $t'_0$, and $t'_2$ be the times spent by a process operator in pre-critical, critical and post-critical segments, respectively, including the time taken to access the shared state. To calculate the wait time w, suppose a process operator from amongst the η such operators acquires a lock at time $t_{init}$. It will take another $C-w-t'_0$ time units to finish the processing. There may be a slack time $t_s$ and a pre-critical processing time $t'_0$ before the operator attempts to acquire the lock again. Therefore, an operator will request the lock every $C-w+t_s$ time units. This observation about the period of lock access request leads to the following lemma.

Lemma 2. Suppose the length of the waiting queue is L at time $t_{init}$. The number of new requests m from time $t_{init}$ to $t_{init}+C-w+t_s$ equals η−1−L (i.e. η−1=L+m).

Proof. Besides the lock holder, the rest η−1 process operators can be classified into two types. First, there are L operators in the waiting queue, which at some time greater than $t_{init}$ will acquire the lock and continue their processing which will take another $C-w+t_s$ time units. Therefore, a new lock request will not arrive for the operators which are waiting in the waiting queue. The remainder η−1−L process operators will request the lock exactly once before the time $t_{init}+C-w+t_s$. This is because the incoming rate satisfies the expression $$\frac{\eta}{R_{in}} \geq C + t_s.$$

Therefore all the operators that are not in the waiting queue will request a lock before the lock holder can request a lock again.

Theorem 1 The length of waiting queue will converge to $$\max\left(0, \eta - \frac{t'_0 + t'_1 + t'_2 + t_s}{t'_1}\right).$$

Proof. Suppose that the current waiting queue size is L and that one operator is holding the lock. Based on Lemma 2, there are η−1 operators in the next time $t'_0+t'_1+t'_2+t_s$ and a maximum of $$\frac{t'_0 + t'_1 + t'_2 + t_s}{t'_1}$$

lock requests can be processed in the given time. Therefore, including the lock holder, the waiting queue size will be, $$\max\left(0, \eta - \frac{t'_0 + t'_1 + t'_2 + t_s}{t'_1}\right)$$

which is independent of the initial size L.

Based on Theorem 1, the wait time can be computed as:

$$w = \max\left(\left(\eta - \frac{t'_0 + t'_1 + t'_2 + t_s}{t'_1}\right) \times t'_1, 0\right) \quad \text{(Expression 7)}$$

Different slack times lead to different values of η. When $t_s>0$, the throughput will always be $R_{in}$. However, a necessary condition for having $t_s>0$ is that the time interval between the incoming tuples must be enough to process η critical segments of length $t'_1$ each. This implies that $$\eta t'_1 < \frac{\eta}{R_{in}} - t'_0 - t'_1 - t'_2$$

$$\eta\left(\frac{1}{R_{in}} - t'_1\right) > t'_0 + t'_1 + t'_2$$

If $$\frac{1}{R_{in}} - t'_1 \leq 0,$$

i.e. if the time spent by an operator in critical section is more than or equal to the inter-arrival time for the incoming tuples then enabling parallelization will not help. When $$\frac{1}{R_{in}} - t'_1 > 0:$$

$$\eta > \frac{t'_0 + t'_1 + t'_2}{\frac{1}{R_{in}} - t'_1} \quad \text{(Expression 8)}$$

The optimal value of η is the minimum value that can satisfy Expression 8. If q is smaller than the determined optimal value it results in a sub-optimal throughput, while a larger η uses more process operators than necessary.

When $t_s=0$ and $$\eta \leq \frac{t'_0 + t'_1 + t'_2}{t'_1},$$

the wait queue for the single shared lock will always be empty and the throughput in this case can be determined using the following formulation:

$$T_{\langle \eta, \alpha_r, \alpha_w, \beta_r, \beta_w \rangle} = \frac{\eta}{t'_0 + t'_1 + t'_2} \quad \text{(Expression 9)}$$

When $t_s=0$ and $$\eta > \frac{t'_0 + t'_1 + t'_2}{t'_1},$$

the throughput in this scenario can then be estimated as:

$$T_{\langle \eta, \alpha_r, \alpha_w, \beta_r, \beta_w \rangle} = \frac{\eta}{t'_0 + t'_1 + t'_2 + w} \quad \text{(Expression 10)}$$

$$= \frac{\eta}{t'_0 + t'_1 + t'_2 + \left(\eta - \frac{t'_0 + t'_1 + t'_2 + t_s}{t'_1}\right)t'_1}$$

$$= \frac{1}{t'_1}$$

Multiple Locks

In some scenarios, there can be more than one shared lock associated with the shared state. This may be done to achieve a finer level of access control and thereby achieve better throughput. For the following discussion, assume there are n shared locks, and an operator must acquire k such locks to enter the critical section, and that n≥k.

Assume that the request to acquire k locks is placed in a queue, and a given request for locks is granted only after all the requests that arrived before have been granted. This also helps in avoiding starvation. If l-1 process have been acquired locks and are executing their critical section, then the probability p' that an operator can enter its critical section can be determined using:

$$p^l = \begin{cases} \dfrac{\binom{n-(l-1)k}{k}}{\binom{n}{k}} & n \geq lk \\ 0 & \text{otherwise} \end{cases} \quad \text{(Expression 11)}$$

To determine the throughput in multiple locks scenario, one must estimate the number of process operators a than can be simultaneously executing their critical section. This expectation for a can then be determined using the following formulation:

$$E(\sigma) = \sum_{i=1}^{i=\eta}\left(\prod_{j=1}^{j=i} p^j\right) \quad \text{(Expression 12)}$$

Theorem 1 can then be rewritten as:
Theorem 2. Suppose there are n locks and each operator will request k random locks before entering the critical processing phase. The length of waiting queue will converge to $$\max\left(0, \eta - \dfrac{E(\sigma)(t'_0 + t'_1 + t'_2 + t_s)}{t'_1}\right)$$

Based on the above theorem, formulas for determining the throughput can be achieved and are similar to the formulas in single lock case.

Access Contention

When several process operators read/write to the same variable in the shared state, contention may happen. This contention results from the fact that the variable being accessed needs to be locked at the remote location for the duration of the read or the write. Note that this duration is not the same as $\phi_r$ and $\phi_w$, which are the access latencies. In several scenarios, the duration of read may be different from the duration of write and therefore there might be different contention values associated with reads and writes. Furthermore, in the present invention, only the shared state accesses done in non-exclusive mode cause contention as the other accesses are exclusive.

Assume that w' is the delay caused by access contention. This contention delay impacts both the read and the write access latency associated with the shared state. Now, given a model $<\eta, \alpha_r, \alpha_w, \beta_r, \beta_w>$, Expression 6 is enhanced by considering the write contention by rewriting it as follows:

$$C'=T+\alpha_r(\phi_r+w')+\alpha_w(\phi_w+w')+2\phi_w+\beta_r\phi_r+\beta_w\phi_w+w \quad \text{(Expression 13)}$$

The maximum throughput for accesses that can be achieved by a variable in the shared state is dependent on the fractions $\alpha_r/(\alpha_r+\alpha_w)$ and $\alpha_w/(\alpha_r+\alpha_w)$ This throughput is represented as $V_{\alpha_r,\alpha_w}$. To avoid contention the number of non-exclusive accesses per unit time should be lesser than $V_{\alpha_r,\alpha_w}$ This leads to the following formulation:

$$\dfrac{\eta(\alpha_r + \alpha_w)}{C'} < V_{\alpha_r,\alpha_w} \quad \text{(Expression 14)}$$

However, when avoiding access contention, the value of w' equals 0, and in such a scenarios C'=C. Therefore, the optimal number of process operators that avoid access contention can be calculated as the maximum value of q which satisfies the following expression:

$$\eta < \dfrac{V_{\alpha_r,\alpha_w}C}{\alpha_r + \alpha_w} \quad \text{(Expression 15)}$$

The proposed generic parallelization model, by virtue of its ability to utilize shared state, can be used to parallelize any stream processing operator. It is possible that in some scenarios the overhead imposed by shared state access in enabling the parallelization might negate the benefits from parallelization. However, as stream processing systems become more widely deployed and the computation per tuple becomes significant enough to cause bottlenecks, operator parallelization will bring substantial benefits. The compiler can then have a choice of using a regular or a parallelized version of the operator depending on the expected usage.

While the proposed parallelization model can be used to parallelize any stream processing operator, not all operators are suitable for parallelization. Using the theoretical formulation for determining operator throughput, described earlier, one can determine if under expected operating environment parallelization will lead to increased throughput or not. These calculations can be used both by the parallel operator library writers and by the compiler (in determining if the operator should be replaced by its parallelized version).

The proposed theoretical model, in case of parallelized operators, can also be used to estimate an optimal level of parallelism. This estimation can either be done at compile time or at runtime. At compile time, based on the expected operating environment, the compiler can estimate the optimal value for $\eta$. At runtime similar calculations could be done to determine $\eta$ on the fly, however, the runtime in this scenario should be capable of adding or removing the process operators from the deployed data-flow.

Implementation

Framework Implementation

The present invention involves implementation of a parallel version of a given stream processing operator such that the compiler, at compile time, can specify the number of process operators. An assumption that the availability of profiling information like average shared state access latency, computation time without shared state access, etc. and information pertinent to shared state access by operator is made. The invention implements a set of default split and merge operators—the two split operators implement round-robin and/or hash-based scheme to route incoming tuples to multiple output streams. The default merge operator just forwards the incident tuples to the output stream. FIG. 3 shows a possible implementation of parallelized operator in a computer code form. Note that the number of process operators is specified by the compiler, and upon code expansion appropriate number of process operators are realized.

The compiler makes use of provided profiling information and shared state access information about the operator to arrive at the decision of replacing an operator with its parallelized version. The compiler also determines the number of process operators during his step. The replacement is seamless to the user, and if the operator's parallelized version has been appropriately implemented it should have no impact on the characteristics of the delivered output tuples.

Application Example—Moving KNN

An example of a stream processing application that can benefit from parallelizing one its bottleneck operator is presented. The application, Moving-KNN, involves tracking the K-nearest neighbors (KNN) of a moving object that can themselves be on the move. Moving-KNN is of immense interest to those involved in developing solutions for traffic monitoring, multiplayer games and mobile technologies. In the streaming version of this application a server (or a stream processing operator) receives continuous updates about the location of the objects, and must return the KNN back to the object. The problem of tracking moving KNN is quite challenging and computationally intensive. At any point in time, the server may be tracking several thousand objects located across a geographically dispersed area, and each such object may update their location at any time to trigger an expensive KNN computation at the server. In some scenarios, when too many objects get involved, maintaining the current location of objects in buffer may itself pose some challenges.

As shown in FIG. 1, an example of stateful bottleneck application is given. Using a K-Nearest Neighbor (KNN) application for real-time highway assistance as an example, three streaming processing applications, such as paramedics (100), fire trucks (200), and enforcement (300) stream the data (400) to the KNN operator or bottleneck operator (500). The assumptions to be made are that the location updates from the objects are tuples with 3 attributes (oid, x, y), where oid is the identifier for the object and x and y denote the current position of the object. For each incoming tuple, the operator computes the KNN and returns it back to the object. The output of the operator is a list containing the identifier of the object and that of K-nearest objects (oid, $id_1, \ldots, id_k$).

A parallelized version of the stream processing operator that performs the moving KNN computation is implemented. In the parallelized version, the split operator uses a hash-based mapping to route an incoming tuple, based on its identifier, to a process operator. The merge operator just forwards the tuples arriving on its input port to its output port. Modifications are made to the simple KNN operator to arrive at the process operator and introduce shared state.

Figure 4A:
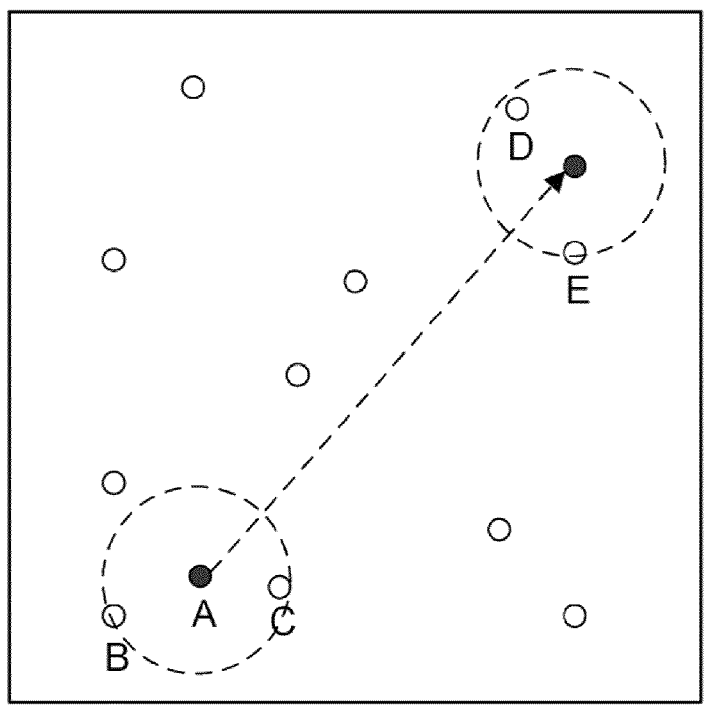
FIG. 4($a$)-4($b$) illustrates parallel operators for Moving KNN.
Figure 4B:
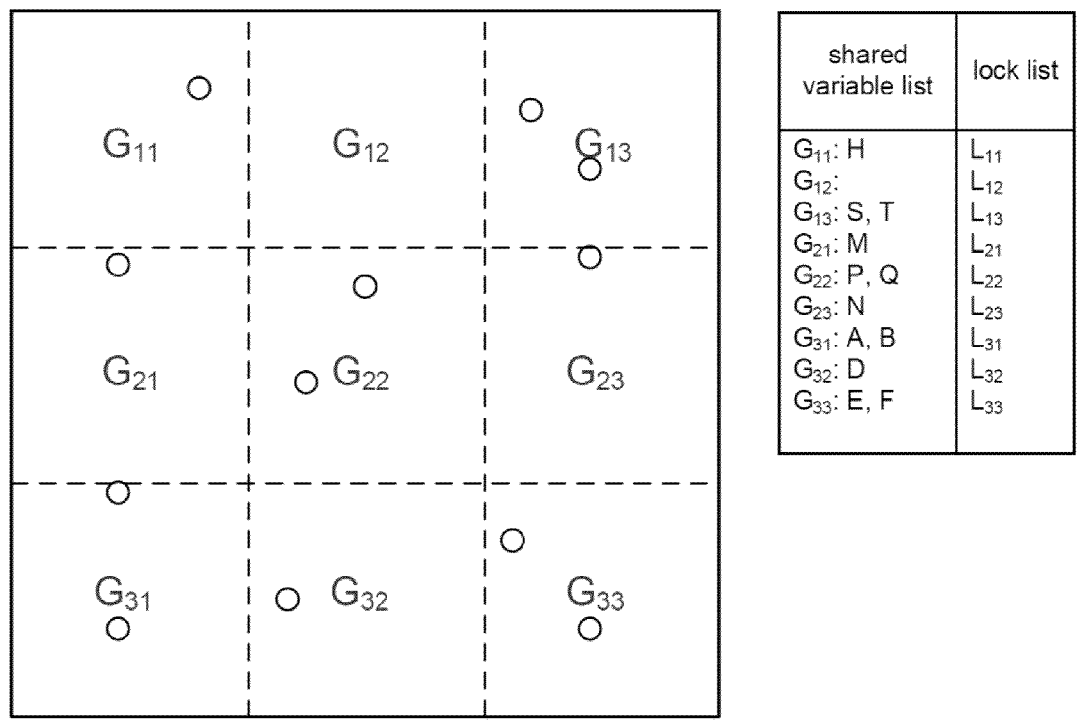

In particular, the geographical region being monitored is partitioned into a grid, and each resulting region is addressable as $G_{i,j}$, where i corresponds to the row and j corresponds to the column. The current location of objects is stored as multiple grid-indexed lists in the shared state, one corresponding to each grid region. Shared locks are maintained, one for each grid-indexed list to enforce consistency. An example grid scheme is shown in FIG. 4A-4B. To calculate the KNN, upon arrival of a tuple at the split operator it is routed to the designated process operator. The process operator then removes the object's known location, if it exists, from the shared state and inserts its new location into the list which corresponds to the updated location. It then proceeds to determine the KNN nearest neighbors by searching in the grid containing the object and in the adjoining grids, and returns the results to the object.

The experiments evaluate two parallelization approaches, which differ in their locking strategies. The approximate KNN (AP-KNN) scheme locks only the lists that correspond to object old and the new location, while the Snapshot KNN (KNN) locks not only the lists at the old and the new location but also locks some grids that surround an objects new location. Other applications of potential interest and the ones that could benefit from parallelization include real-time social network graph mining, stock prediction, trading applications and filtering.

Experimental Evaluation

A set of experiments were run to evaluate the suitability and performance of the parallelization framework. First, microbenchmarks were run to examine specific features of the system. An end-to-end setup was made for experimenting with the moving KNN application. The results show that the proposed generic parallelization model is effective at reducing the impact of bottleneck operators on application performance and also verify the correctness of the theoretical model.

Microbenchmarks

The following set of experiments was conducted to verify the correctness of the proposed theoretical model. Unless otherwise specified, the use of net throughput (tuple processed per second) as the metric for comparing the performance.

Figure 5:
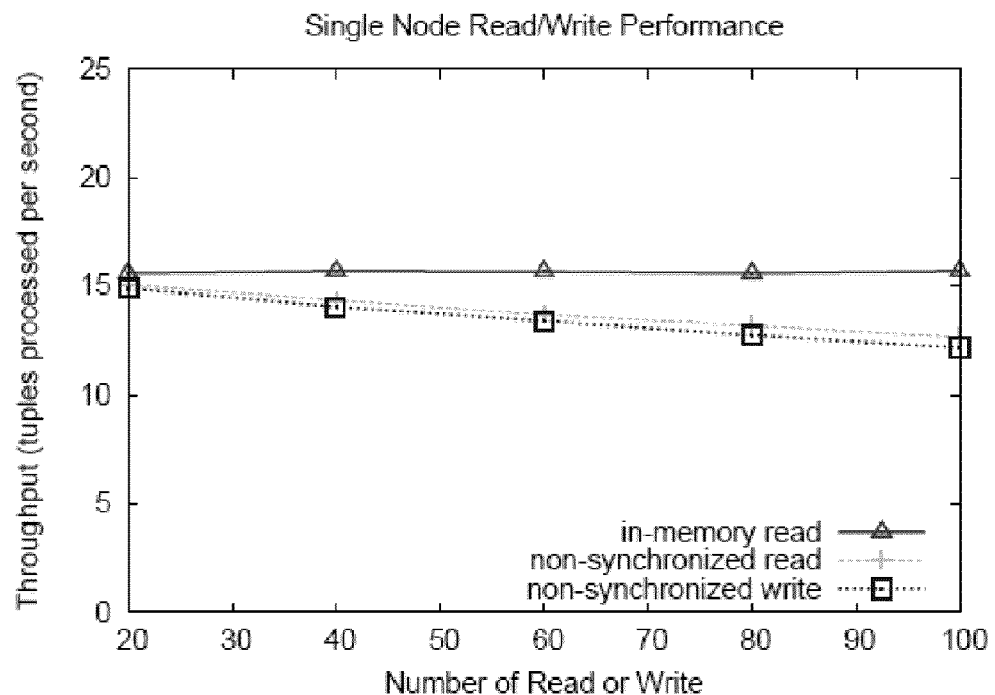
FIG. 5 illustrates the performance of a throughput of a single operator.

The first experiment was conducted to compare the performance of a regular stream processing operator, and the performance of its parallelized version with 1 process operator and shared state access, but no locks. For the experiment the arrival of generated input stream tuples was configured to follow a Poisson distribution with p=20 msec, which resulted in ≈80 tuples per second. Furthermore, the synthetic operator had a total processing duration per tuple of 60 msec (i.e. T=60 msec). FIG. 5 shows the impact of the number of shared memory reads and writes per tuple on the performance of the operators. The regular operator is not affected by an increasing number of memory operations, as local memory access time is not significant compared to T. Furthermore, as expected, a decrease in throughput of the operators accessing the shared state. Using Expression 2 and the results from FIG. 5 can estimate the average access latency to the shared memory as:

$$\phi_r=0.153 \text{ms}, \phi_w=0.185 \text{ ms}$$

The next experiment was conducted to measure the performance of parallelized operators that do not require exclusive access to any part of the shared state, and to verify the corresponding theoretical model explained earlier. The input stream was similar to the one used for previous experiment. The parallelized operator from previous experiment with T=60 msec were used, but varied the number of process operators and the number of nonexclusive reads and writes. For process operator with 50 reads, 100 reads and 50 writes per tuple the behavior is almost similar in terms of delivered throughput.

However, for the scenario with 100 writes per tuples the behavior a significantly different behavior, which can be attributed to the write contention, as explained in earlier. For the cases without access contention, an estimation of the throughput for specific scenarios using the theoretical model and also list the observed experimental value in square brackets.

$$T_{(3,50,0,0,0)} = \frac{3*1000}{60+50*0.153} \approx 44 \qquad [41]$$

$$T_{(3,0,100,0,0)} = \frac{3*1000}{60+100*0.185} \approx 38 \qquad [32]$$

$$T_{\langle 7,0,50,0,0\rangle} = \frac{3*1000}{60+100*0.185} \approx 86 \quad [75]$$

Figure 6:
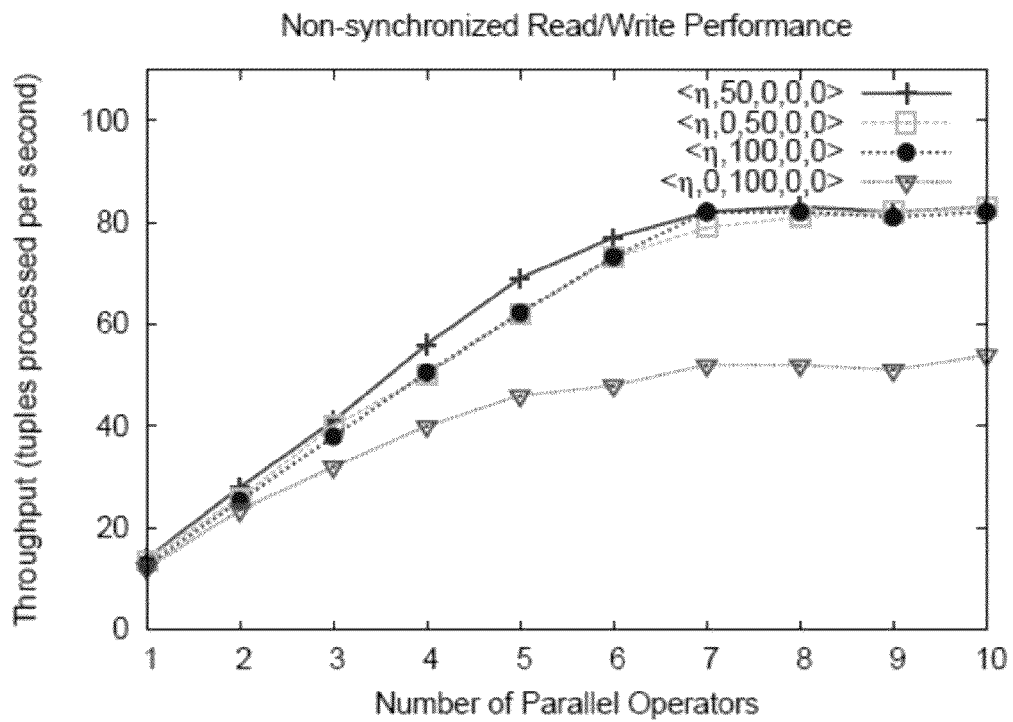
FIG. 6 illustrates performance of a throughput with non-exclusive access.

The theoretical model, even with very simple profiling of the shared state access latency, is able to provide good estimate of the throughput. Also note that the maximum throughput is bounded by the incoming rate, which in this case is ≈80. In the scenario, where access contention happens the throughput is limited by the maximum number of read/write accesses that can be handled by the shared state. From FIG. 6, <10, 0, 100, 0, 0> is ≈55 and therefore one can estimate the maximum number write throughput as 100×55=5500. Using the formulation from Expression 15, one can estimate the value of η for which the contention happens. For <η, 0, 100, 0, 0> the value is determined to be ≈4.3, and it translates to an accurate estimate of 5 process operators at which one starts observing contention.

Figure 7:
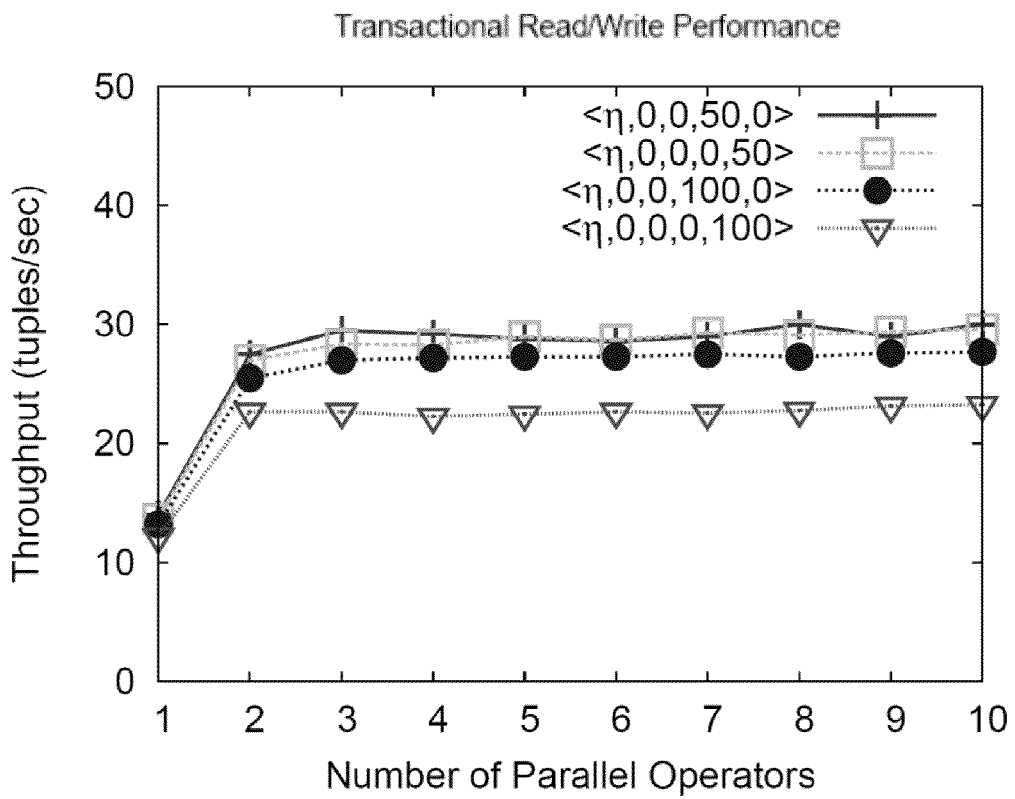
FIG. 7 illustrates performance varying number of exclusive read and write accesses.

An experiment to observe the effect of exclusive access on the throughput of a parallelized operator was conducted. The experiment was conducted for varying number of exclusive read and write accesses. In the results, shown in FIG. 7, the throughput almost doubles when an increase of the number of process operators is 2. However, further increase in the degree of parallelism results only in small improvement in the throughput. This observation is consistent with the analysis of lock contention. The duration of critical section determines the throughput. Using the theoretical model, following values for the throughput are provided. Again, the number in square brackets represents the observed throughput.

$$T_{\langle 3,0,0,50,0\rangle} = \frac{1}{20+5+50*0.153} \approx 30 \quad [29]$$

$$T_{\langle 3,0,0,0,100\rangle} = \frac{1}{20+5+100*0.185} \approx 23 \quad [22]$$

The cost model provides an accurate estimation of the throughput for this scenario. 5 msec is added to the factor of the above expressions as the operator will wait for 10 msec before it tries to get the lock again (therefore the average waiting time is 5 msec). Furthermore, the optimal number of process operators in this scenario can be determined using Expression 8, as:

$$\eta > \frac{60+100\times 0.185}{20+100\times 0.185}$$

The optimal value of η using the above formulation is found to be 3, and again this is an accurate estimate.

Figure 8:
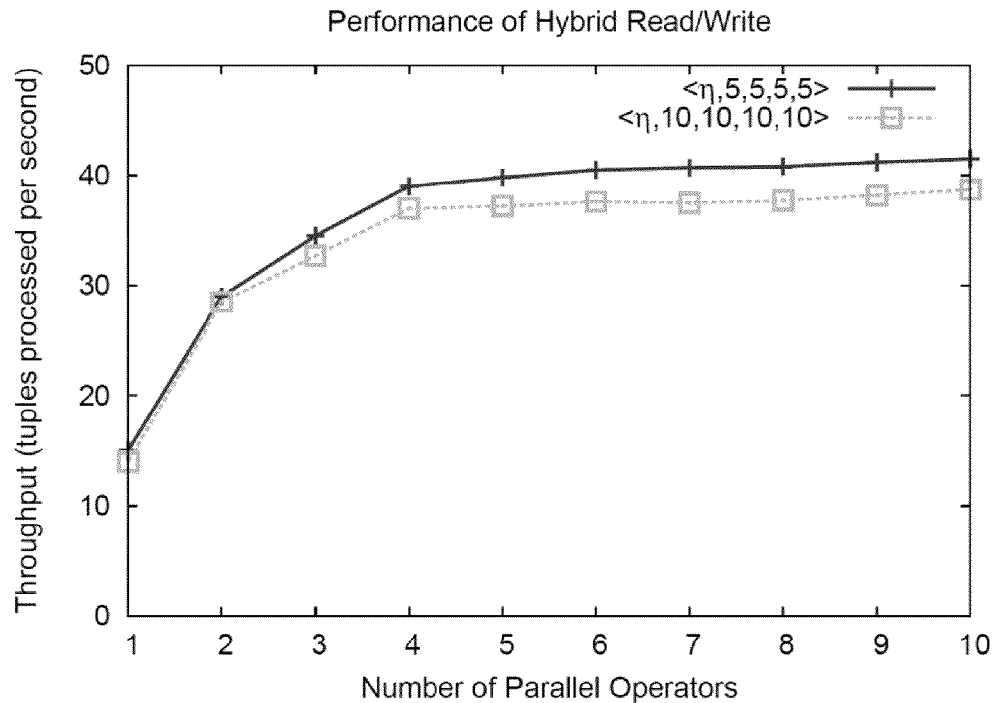
FIG. 8 illustrates the throughput of two hybrid cases.

An evaluation of the throughput of a parallelized operator, when both exclusive and non-exclusive access is performed by the process operator is provided. FIG. 8 shows the throughput corresponding to two cases.

Next, a test the hybrid case is provided, where the processing involves both non-synchronized and synchronized access. FIG. 8 shows the throughput of two hybrid cases, <η, 5, 5, 5, 5> and <η, 10, 10, 10, 10>. Based on the theoretical model the optimal value of η for <η, 5, 5, 5, 5> and <η, 10, 10, 10, 10> should satisfy:

$$\eta_{\langle \eta,5,5,5,5\rangle} > \frac{60+10\times 0.153+10\times 0.185}{20+5\times 0.153+5\times 0.183}$$

$$\eta_{\langle \eta,10,10,10,10\rangle} > \frac{60+20\times 0.153+20\times 0.185}{20+10\times 0.153+10\times 0.183}$$

The above expressions result in η=3 for both cases, which is not consistent with the observed value of 4 for optimal throughput. With better profiling and adaptive tuning at runtime, one can overcome the misestimates done by the theoretical model.

Parallelized Moving KNN

A second set of experiments to evaluate the performance of the parallelization framework for a real application, Moving KNN, is provided. For the experiments, a region of 1000× 1000 square units divided into a 10×10 grid. The 100 grid regions, so formed, result in a shared state with 100 shared lists and 100 shared locks. 100,000 objects are generated uniformly distributed across the grid, and each grid has approximately 1000 objects. Each object moves at a random speed. In the following experiments, measurements of the maximum possible throughput are made and therefore the incoming stream rate is fast enough to not let any process operator be idle.

Figure 9:
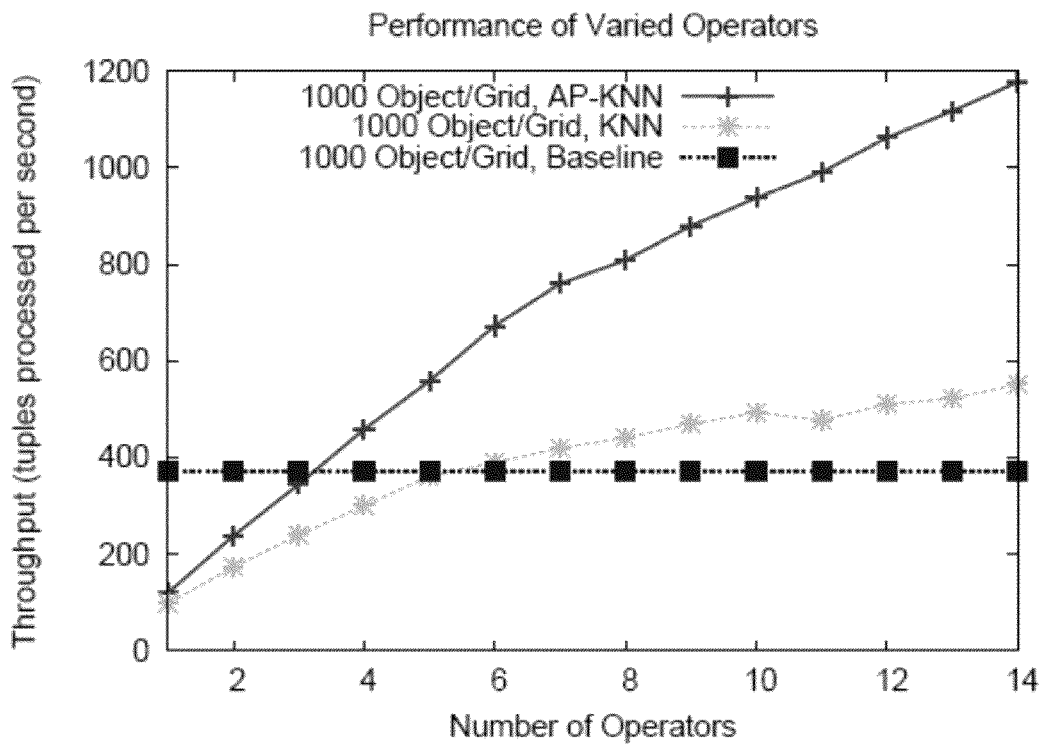
FIG. 9 illustrates AP-KNN and KNN, of the moving KNN application experimental results.

The first experiment in this set was focused on illustrating the impact of q on the throughput. The number of process operators was varied from 1 to 14 for the two parallelized implementations, AP-KNN and KNN, of the moving KNN application and their throughputs were measured. The 'baseline' as the throughput of regular, non-parallelized version of the moving KNN operator was measured. Experimental results shown in FIG. 9 clearly illustrate the effect of parallelism. When is less than 3, both AP-KNN and KNN have a throughput that is lesser than the baseline throughput. This can be attributed to the overhead imposed by shared state accesses. AP-KNN performs better than KNN, because it only locks two regions of the grid and incurs less lock contention.

Figure 10:
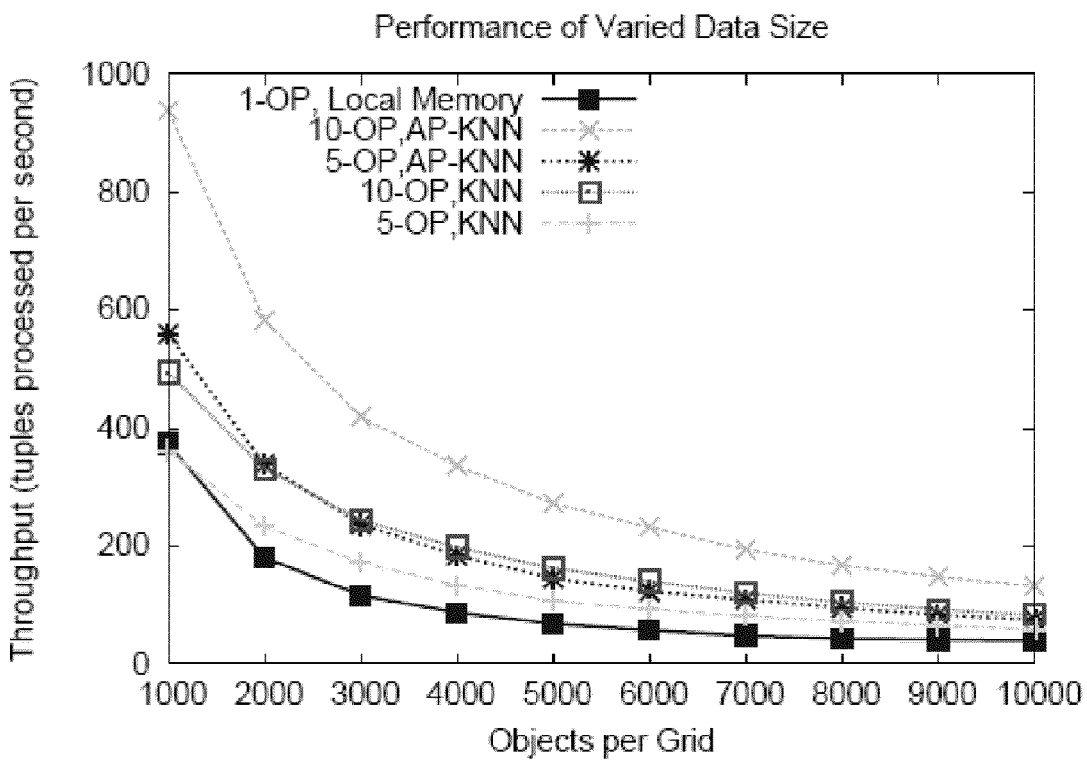
FIG. 10 illustrates the impact of increasing the number of objects per grid region on the throughput of the application.

The next experiment was conducted to study the impact of increasing the number of objects per grid region on the throughput of the application. Increased number of objects results in an increased amount of computation that needs to be performed for each tuple. The number of objects per grid region was varied from 1,000 to 10,000. The AP-KNN and KNN algorithms were evaluated for two different values of η, 5 and 10. The throughput of the non-parallelized operator is again used as the baseline. More objects lead to more shared state access cost and a very significant increase in the KNN computation cost. FIG. 10, shows the rapid decrease in throughput for all implementations as the number of objects per grid region is increased. However, the parallelized operators fare much better than their non-parallelized counterpart.

Figure 11:
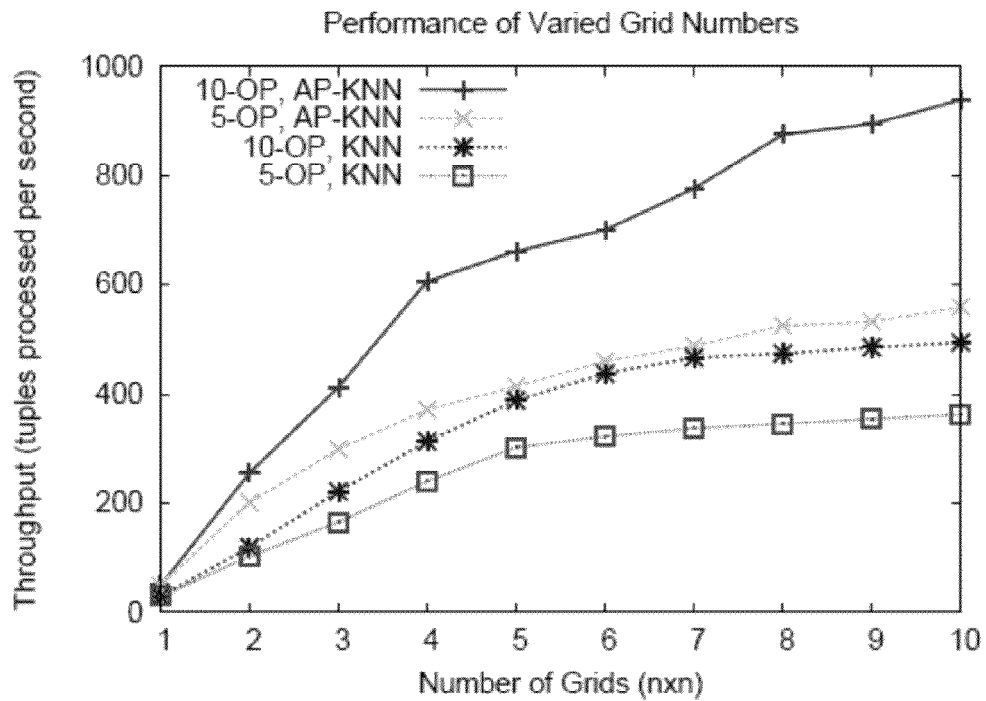
FIG. 11 illustrates the impact of changing the number of grid regions on the throughput, while keeping the total area constant was measured.

The impact of changing the number of grid regions on the throughput, while keeping the total area constant was measured, specifically, by changing the number of grid regions from 1×1 to 10×10. A fine-grained grid-index reduces the number of objects per grid and therefore reduces the number of objects retrieved for KNN computation. Furthermore, more grid regions also result in more fine-grained locking and this helps in reducing the lock contention. However, increasing the number of grids beyond a certain threshold (6 in this case) does not have any significant impact on the throughput. The results are shown in FIG. 11.

Figure 12:
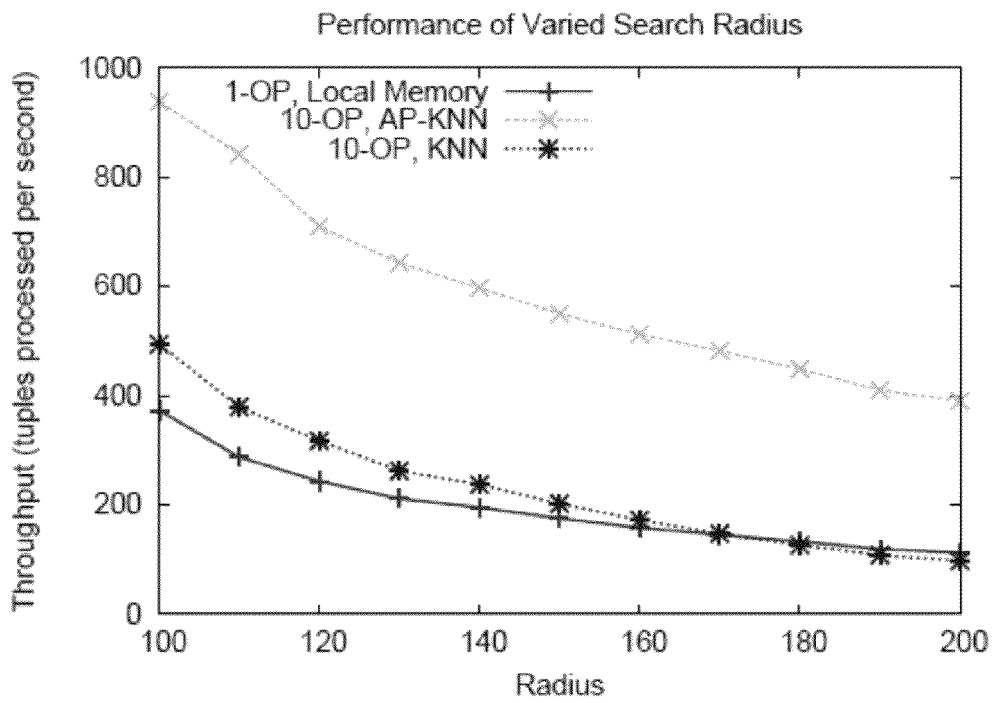
FIG. 12 illustrates throughput of the KNN application with respect to increasing search radius.

The initial search radius is set to 100 by default. If more number of neighbors has to be retrieved, one may have to enlarge the search radius. In this experiment, the initial search radius was varied from 100 to 200. In FIG. 12, it is observed that the throughput of the KNN application decreases with increasing search radius. This is because a large search radius overlaps with more regions in the grid and results in increased KNN computation and shared state access cost. For, KNN, larger search radius also implies greater lock contention. Again, the parallelized version of the moving KNN application performs better than the non-parallelized version.

Figure 13:
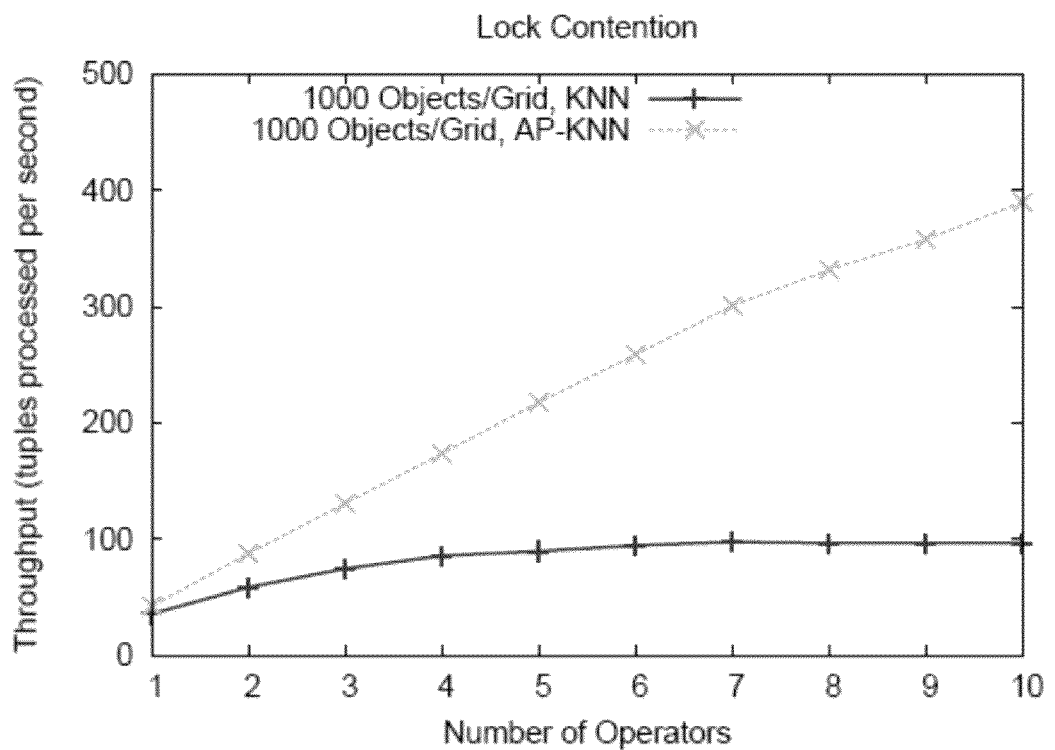
FIG. 13 illustrates the impact of lock contention on the throughput of the parallelized operators.

If the duration for which the process operator holds a lock is not significant, then the lock contention are not observed. However, when this duration increases, the lock contention are observed. An experiment to demonstrate the impact of lock contention on the throughput of the parallelized operators was conducted. When search radius set to 200, the number of process operators were varied from 1 to 10. Results are shown in FIG. 13. A search radius of 200 significantly increases the time for which the KNN implementation should hold multiple locks. This results in severe lock contention and the throughput of the KNN implementation does not increase after $\eta=4$. However, the throughput of the AP-KNN application, which locks only two grid regions, increases almost linearly.

Figure 14:
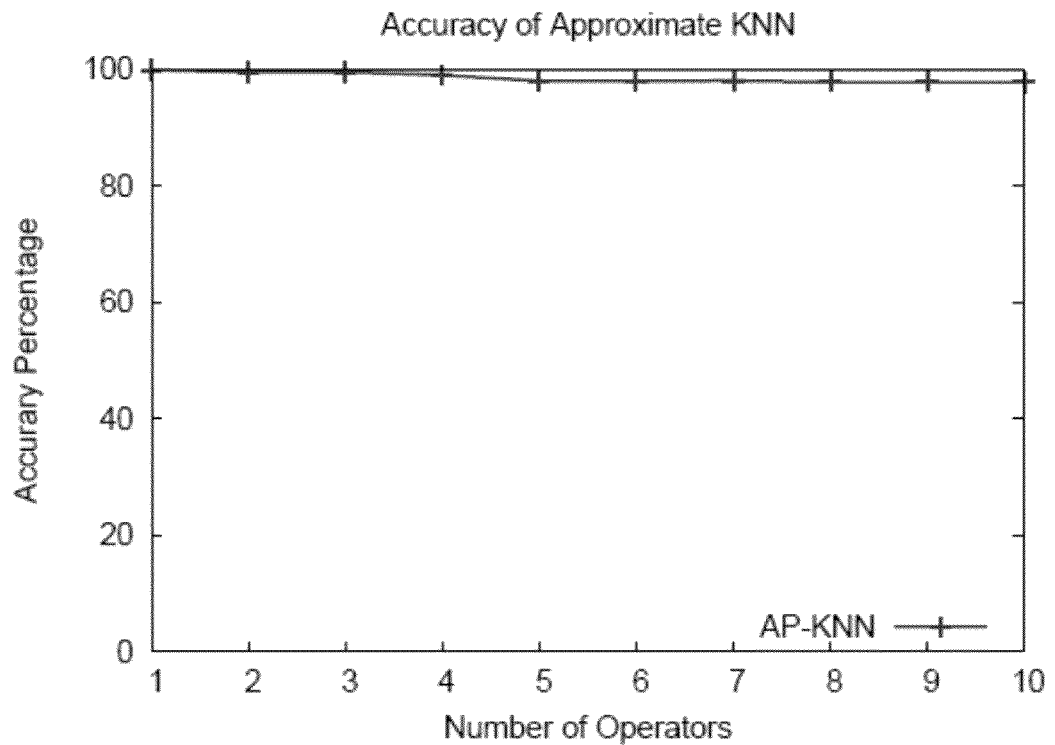
FIG. 14 illustrates the results of the two algorithms in terms of accuracy.

KNN incurs much higher overheads than AP-KNN due to its locking strategy, but it provides snapshot consistency for the results. The AP-KNN implementation, on the other hand, does not offer any such guarantee. In FIG. 14 the results of the two algorithms in terms of accuracy are compared. Specifically, the results of KNN as the ground truth are used and the accuracy of the results of AP-KNN are computed. Suppose for the request from the same object, KNN and AP-KNN return the result set $R_0$ and $R_1$, respectively. Then the accuracy of AP-KNN implementation is computed as:

$$\text{accuracy} = \frac{|R_0 \cap R_1|}{|R_0|}$$

Results, shown in FIG. 14 illustrate that AP-KNN provides almost the same accuracy as the KNN implementation (95%). Therefore, in scenarios where strict consistency is not required, one can achieve better performance by trading-off some consistency.

Figure 15:
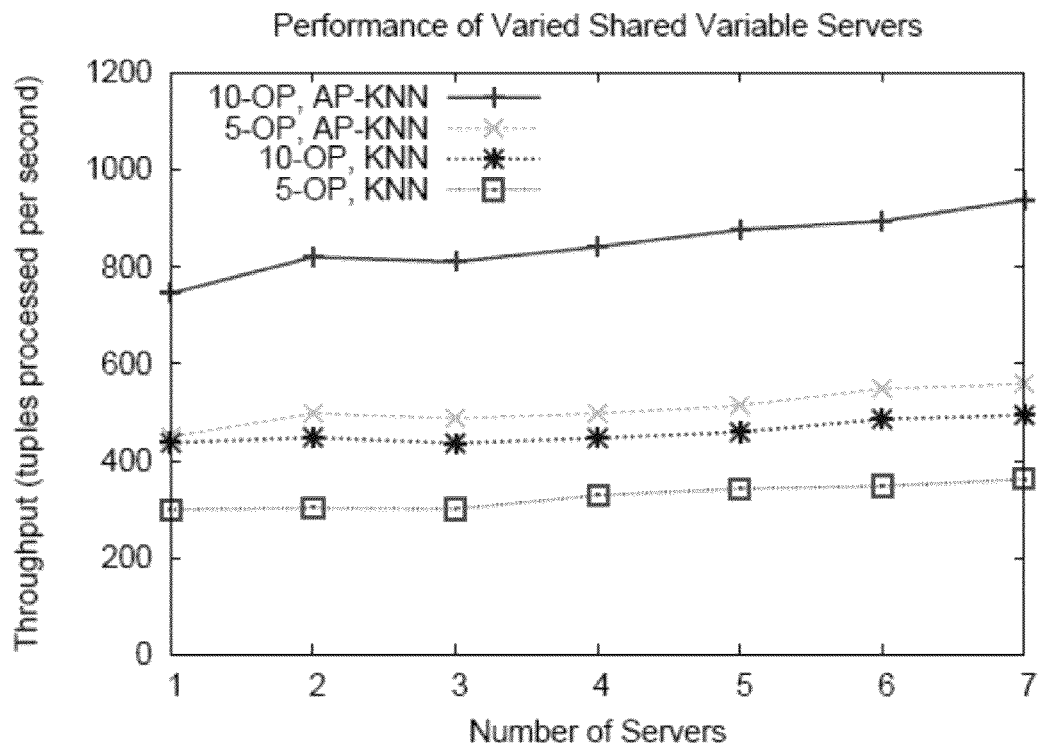
FIG. 15 illustrates throughput when varying servers for hosting the shared state.

An experiment was conducted to ensure that the shared state infrastructure, which in the above experiments was hosting 100 shared lists and 100 shared locks, was not causing performance degradation. After varying the number of servers hosting the shared state from 1 to 7, the impact of this was observed on the throughput of the parallelized implementations. FIG. 15 shows that there is not any significant degradation in the throughput when using a single server for hosting the shared state.

Multi-Threaded Implementation

The performance of the parallelized implementation of the moving KNN application is also compared with a version of the application that uses multi-threading. As compared to the parallelized implementation, the multi-threaded version runs on a single node, but as a result is able to access and maintain state locally and in some cases may also be able to exploit the capability provided multicore processors. Similar to the parallelized implementation realized are 100 lists and 100 locks in local memory and in the context of the multi-threaded process. Expected results were to be a near linear speedup, however, the experiment observed an increase in throughput from 1 to 2 threads, a subsequent degradation in throughput until 4 threads and then it stabilized back to the throughput level that was observed for 2 threads.

Figure 16:
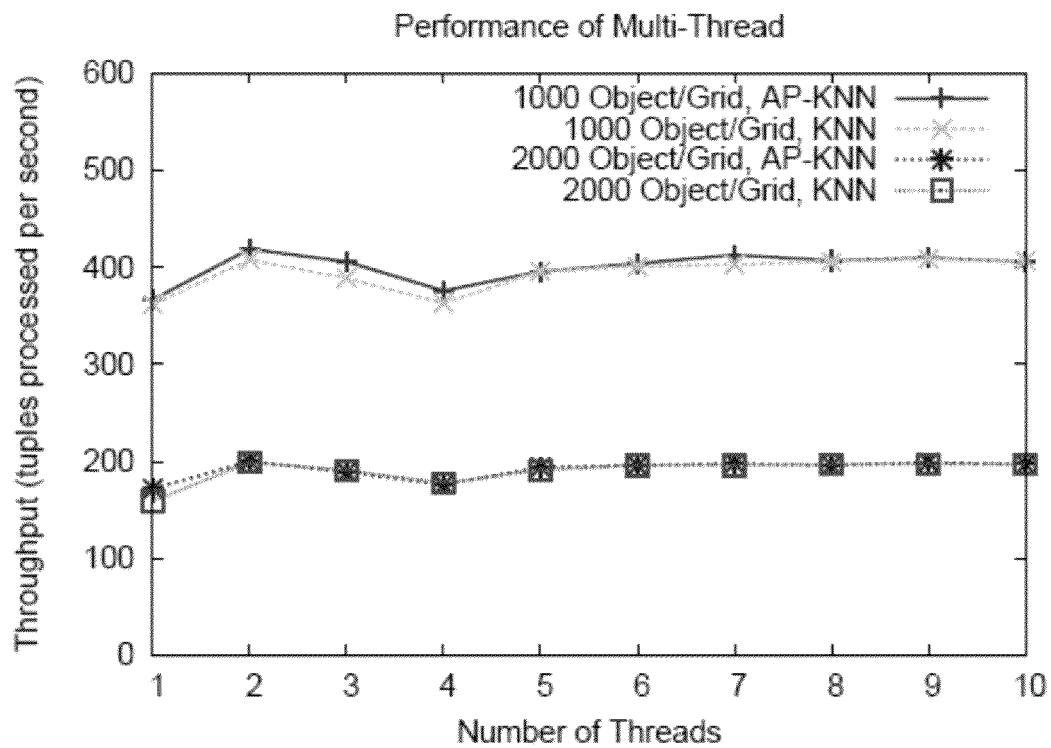
FIG. 16 illustrates the throughput varying with the number of threads.

The experiment was able to explain the strange behavior by observing that the compute nodes were 2× dual core processors. The access to L2 cache is substantially faster than to the memory higher up in the hierarchy, and the dual cores on the processor share a L2 cache. When the number of threads was increased to 2 the threads shared a fast L2 cache and this cache was not being invalidated. However, when the third thread is added it starts running on another processor and the threads no longer share a L2 cache, which results in rapid cache invalidations and therefore a degradation in performance. To verify the hypothesis, a hypothetical multi-threaded version of the KNN operator in which each thread maintained its own grid was tested. With no state being shared between the threads, a linear speedup that peaked at 4 threads was observed, which in this case corresponded to the number of cores in the compute node. Results are shown in FIG. 16. A multi-threaded implementation may be a solution for increasing the throughput of several operators, but one must not rule out the parallelized implementations with shared state as in many cases such implementations can offer much better performance and can scale beyond the compute and memory capabilities of a single compute node.

The invention presented is a parallelization framework for stateful stream processing operators. The framework consists of a generic parallelization model and an associated theoretical model. The paper addresses important issues related not only to the system support and model for parallelization, but also delves into the theoretical details that model the suitability of parallelization and the optimal degree of parallelism. The parallelization framework using microbenchmarks verified the correctness of the proposed theoretical model. An implementation of a moving KNN application to showcase the impact of various application level considerations on the throughput is realized. The aim is to enable the support for parallelization framework and provide a default toolkit that contains parallelized version of commonly used operators. Runtime adaptation to a parallelized operator and trading consistency for throughput are some interesting areas for future research.

Figure 18:
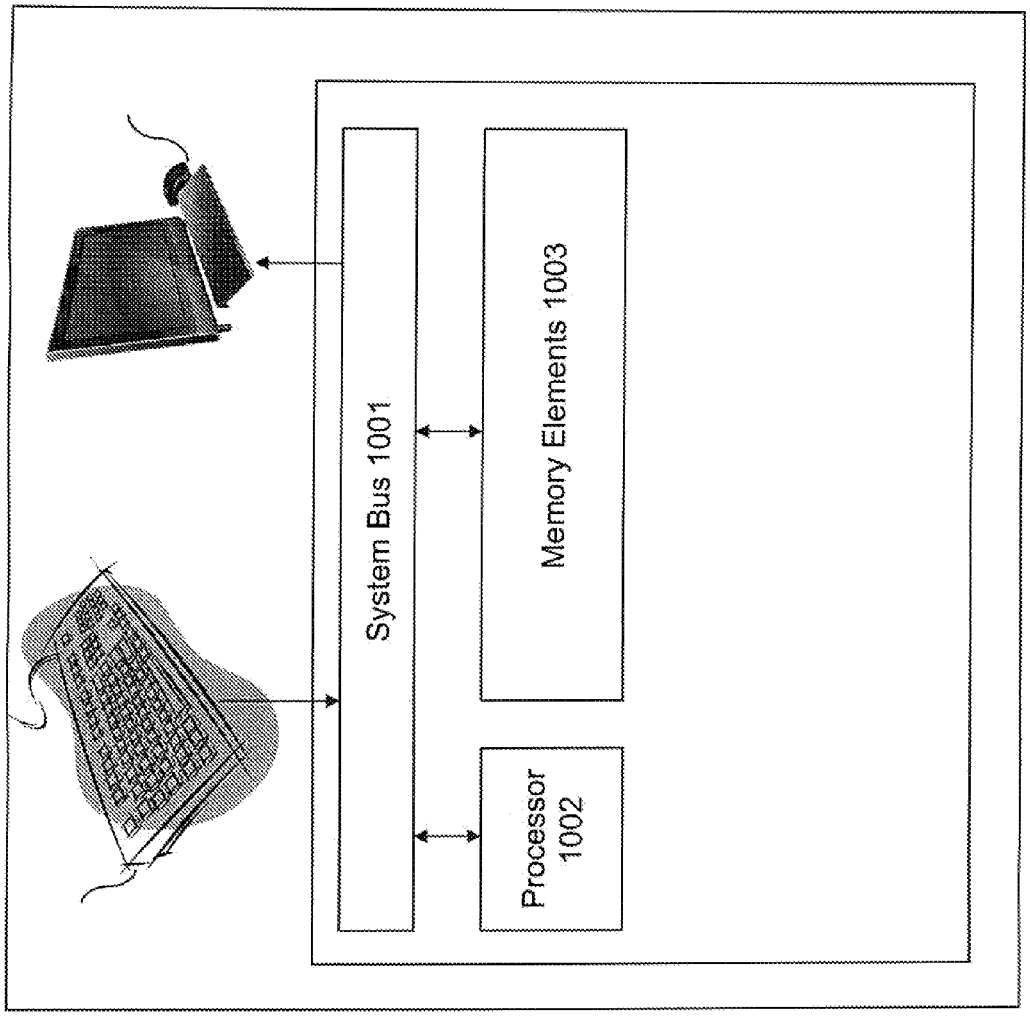
FIG. 18 illustrates an overview of a system for calculating the theoretical model.

FIG. 18 is a block diagram of a system (hereinafter "system") 1000 for calculating the theoretical model in accordance with an embodiment of the present invention. The system 1000 can include at least one processor 1002 coupled to memory elements 1003 through a system bus 1001. As such, the system 1000 can store program code within the memory elements 1003. The processor 1002 can execute the program code accessed from the memory elements 1003 via the system bus 1001. In one aspect, for example, the system 1000 can be implemented as computer that is suitable for storing and/or executing program code. It should be appreciated, however, that the system 1000 can be implemented in the form of any system including a processor and memory that is capable of performing the functions described within this specification.

The memory elements 1003 can include one or more physical memory devices such as, for example, local memory (not shown) and one or more bulk storage devices (not shown). Local memory refers to random access memory or other non-persistent memory device(s) generally used during actual execution of the program code. Bulk storage device(s) can be implemented as a hard disk drive (HDD), solid state drive (SSD) or other persistent data storage device. The system 1000 also can include one or more cache memories (not shown) that provide temporary storage of at least some program code in order to reduce the number of times program code must be retrieved from bulk storage device during execution.

Input/output (I/O) devices such as a keyboard 1004, a display 1005, and a pointing device (not shown) optionally can be coupled to the system 1000. The I/O devices can be coupled to the system 1000 either directly or through intervening I/O controllers. Network adapters also can be coupled to the system 1000 to enable the system 1000 to become coupled to other systems, computer systems, remote printers, and/or remote storage devices through intervening private or public networks. Modems, cable modems, and Ethernet cards are examples of different types of network adapters that can be used with the system 1000.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more computer readable medium (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces). It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider)

The invention claimed is:

1. A method of enabling compiler assisted parallelization of one or more stream processing operators in a stream processing application operating on a computer processing device, the method comprising:
    creating a theoretical model of one or more operators in a compiler, wherein the theoretical model is based on a plurality of factors comprising an average processing time per tuple, an average number of accesses to a shared state per tuple, and a time to read/write to the shared state;
    specifying a parallelized version of the one or more operators in the stream processing application based on the theoretical model;
    evaluating whether the theoretical model improves the performance of the one or more operators, wherein evaluating whether the theoretical model improves the performance of the one or more operators comprises:
        determining the greater of the throughput of a single operator and the throughput of the parallelized operator at compile time;
    computing a degree of parallelism if the theoretical model improves the performance of the one or more operators; and
    replacing, by the compiler, the one or more operators with the parallelized version of the one or more operators, in response to computing the degree of parallelism.

2. The method of claim 1, wherein specifying the parallelized version of the one or more operators in the stream processing application based on the theoretical model comprises:
    providing the parallelized version of the one or more operators as part of a library associated with the stream processing application.

3. The method of claim 1, wherein the computing of the degree of parallelism occurs at compile time.

4. The method of claim 1, wherein the computing of the degree of parallelism occurs at run time.

5. The method of claim 1, wherein the parallelized version of the one or more operators utilizes a shared state.

6. A non-transitory computer readable storage medium embodying a computer readable program code having computer readable instructions to enable compiler assisted parallelization of one or more stream processing operators in a stream processing application operating on a computer processing device which, when implemented, cause a computer to:
- create a theoretical model of one or more operators in a compiler, wherein the theoretical model is based on a plurality of factors comprising an average processing time per tuple, an average number of accesses to a shared state per tuple, and a time to read/write to the shared state;
- specify a parallelized version of the one or more operators in the stream processing application based on the theoretical model;
- evaluate whether the theoretical model improves the performance of the one or more operators, wherein the computer readable instructions to evaluate whether the theoretical model improves the performance of the one or more operators further causes the computer to:
  - determine the greater of the throughput of a single operator and the throughput of the parallelized operator at compile time;
- compute the degree of parallelism if the theoretical model improves the performance of the one or more operators; and
- replace, by the compiler, the one or more operators with the parallelized version of the one or more operators, in response to computing the degree of parallelism.

7. The computer readable storage medium of claim 6, wherein the computer readable instructions to specify the parallelized version of a the one or more operators in the stream processing application based on the theoretical model further causes the computer to:
- provide the parallelized version of the one or more processing operators as part of a library associated with the stream processing application.

8. The computer readable storage medium of claim 6, wherein the computer readable instructions to compute the degree of parallelism occurs at compile time.

9. The computer readable storage medium of claim 6, wherein the computer readable instructions to compute the degree of parallelism occurs at run time.

10. The computer readable storage medium of claim 6, wherein the parallelized version of the one or more operators utilizes a shared state.

11. A system of enabling compiler assisted parallelization of one or more stream processing operators in a stream processing application operating comprising
- a computer processing device; and
- a memory coupled to the computer processing device, wherein the memory comprises instructions which, when executed by the computer processing device, cause the computer processing device to:
- create a theoretical model of one or more operators in a compiler, wherein the theoretical model is based on a plurality of factors comprising an average processing time per tuple, an average number of accesses to a shared state per tuple, and a time to read/write to the shared state;
- specify a parallelized version of the one or more operators in the stream processing application based on the theoretical model;
- evaluate whether the theoretical model improves the performance of the one or more operators, wherein the instructions to evaluate whether the theoretical model improves the performance of the one or more operators further causes the computer processing device to:
  - determine the greater of the throughput of a single operator and the throughput of the parallelized operator at compile time;
- compute the degree of parallelism for the one or more operators if the theoretical model improves the performance of the one or more operators; and
- replace, by the compiler, the one or more operators with the parallelized version of the one or more operators, in response to computing the degree of parallelism.

12. The system of claim 11, wherein the instructions to specify the parallelized version of the one or more operators in the stream processing application based on the theoretical model further causes the computer processing device to:
- provide the parallelized version of the one or more operators as part of a library associated with the stream processing application.

13. The system of claim 11, wherein the instructions to compute the degree of parallelism occurs at compile time.

14. The system of claim 11, wherein the instructions to compute the degree of parallelism occurs at run time.

15. The system of claim 11, wherein the parallelized version of the one or more operators utilizes a shared state.

* * * * *